UNITED STATES PATENT OFFICE.

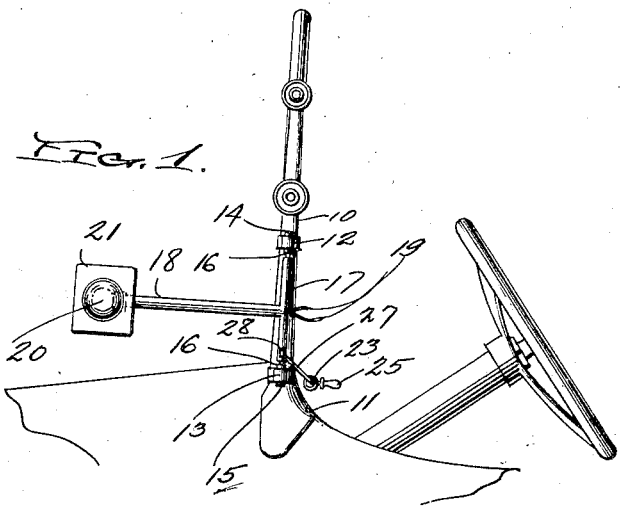
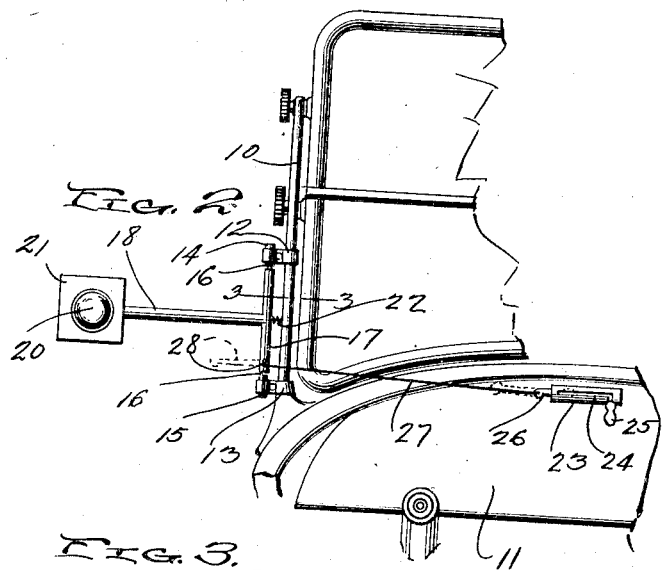
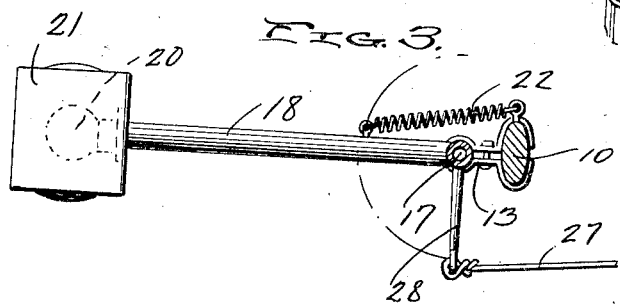

SAMUEL E. ALLEN, OF MARTIN, SOUTH DAKOTA.

DIRECTION-SIGNAL.

1,357,433.  Specification of Letters Patent.  Patented Nov. 2, 1920.

Application filed December 24, 1919. Serial No. 347,160.

*To all whom it may concern:*

Be it known that I, SAMUEL E. ALLEN, a citizen of the United States, residing at Martin, in the county of Bennett, State of South Dakota, have invented certain new and useful Improvements in Direction-Signals; and I do hereby declare the following to be a full, clear, and exact description of the invention, such as will enable others skilled in the art to which it appertains to make and use the same.

This invention relates to new and useful improvements in signaling devices and particularly to signaling devices for automobiles and other vehicles, to indicate change of direction.

One object of the present invention is to provide a novel and improved device of this character which is readily capable of attachment to the windshield of an automobile.

Another object is to provide a novel and improved device of this character which is normally held in inoperative position and which is easily operated by the driver to move the same into direction indicating position.

Other objects and advantages will be apparent from the following description when taken in connection with the accompanying drawing.

In the drawing:

Figure 1 is a side elevation of a portion of an automobile equipped with my improved direction indicator, the signal arm being in inoperative position.

Fig. 2 is a rear elevation of a portion of the windshield showing the signal arm in operative position.

Fig. 3 is a horizontal sectional view taken on the line 3—3 of Fig. 2, just below the signal arm.

Referring particularly to the accompanying drawing, 10 represents one of the vertical side bars of the frame of the windshield, and 11 a portion of the dashboard of the automobile in connection with which the direction signal is used.

Secured to the side bar 10 of the windshield are the upper and lower brackets 12 and 13, which support the upper and lower socketed bearing blocks 14 and 15, respectively, the socket portions being directed toward each other for the reception of the pintle ends 16 of the vertical rock shaft 17. Secured to this shaft, and extending forwardly therefrom, is the signal arm 18, the same being in the form of a tube to receive the electric wires 19 therethrough for connection with the lamp 20 mounted in the casing 21, on the outer end of said arm. Secured at its opposite ends to the arm 18 and to the bar 10 of the windshield frame, is a coil spring 22 which normally urges the arm into a position pointing straight forwardly of the automobile.

Mounted on the inner face of the dashboard, within easy reach of the driver, is an elongated cylinder 23 having a longitudinally extending bayonet slot 24 in its front face. Slidable in this cylinder and having a hand grip 25 extending through the slot, is a rod 26. To one end of the rod is connected one end of a cord or wire 27, the other end of said cord or wire being connected to a short arm 28 carried by and extending outwardly from the rock shaft 17, below the signal arm 18, and disposed at ninety degrees therefrom. The hand grip portion of the rod is adapted to be engaged in the inner end of the bayonet slot to hold the rod in its innermost position and with the signal arm in extended position laterally at the side of the automobile, indicating that the automobile is to change its direction of travel. It will be noted that the spring is under tension when the arm extends at the side of the automobile, and when the hand grip of the rod is moved out of the inner holding end portion of the slot, this spring will act to restore the arm to its normal forwardly extending position, and pull the rod toward the outer end of the cylinder 23. Thus it is only necessary to swing the hand grip upwardly when the spring will restore all of the parts to normal non-indicating position.

What is claimed is:

The combination with the frame of an automobile windshield, of a pair of brackets each comprising plates having their ends bowed oppositely and provided with means for drawing them together, the bows at one end of the plates being engaged with the windshield frame, socket blocks held between the remaining bowed ends of the plates, the brackets being in spaced relation, a vertical shaft having its ends reduced with resultant pintles that are journaled in the socket blocks, a signal radiating from the shaft, a helical spring attached to the signal and to the windshield frame in position to hold the signal yieldably at one limit of its movement with the shaft, an arm projecting from the signal, and means connected with the arm for swinging the signal shaft against the action of the spring.

In testimony whereof, I affix my signature, in the presence of two witnesses.

SAMUEL E. ALLEN.

Witnesses:
WM. WEBER,
J. W. SNYDER.